Nov. 2, 1943.  D. E. RENSHAW ET AL  2,333,580
LEAD ENTRANCE
Filed March 19, 1942  2 Sheets-Sheet 1
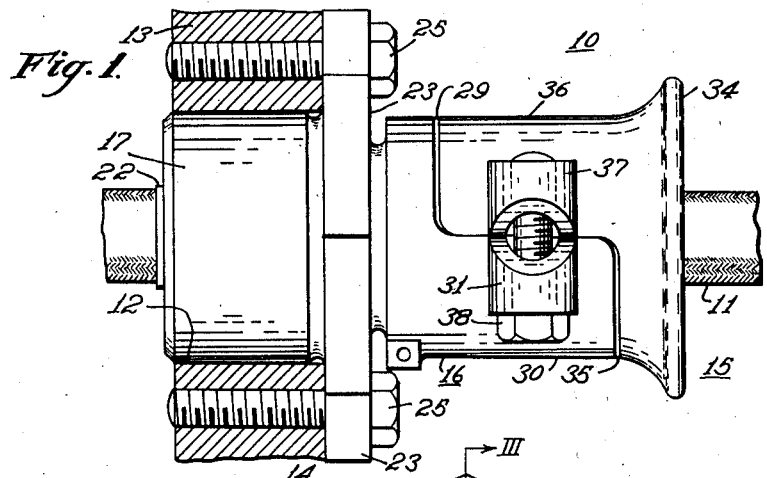
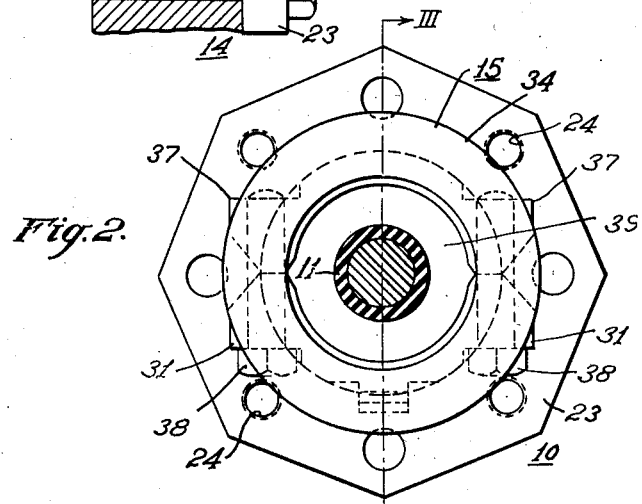
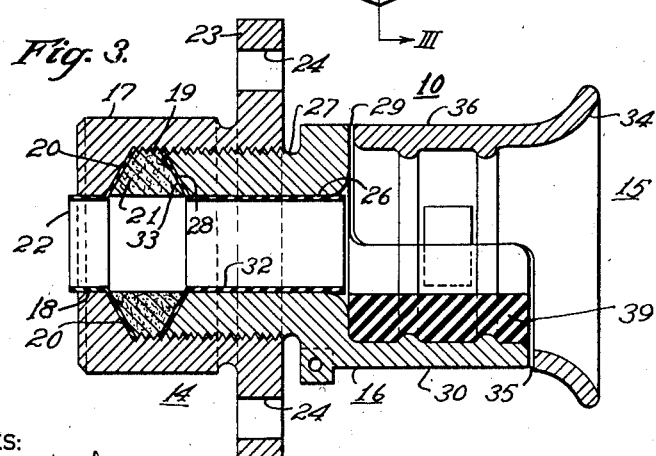
WITNESSES:
Edward Michaels
F. V. Giolma
INVENTORS
David E. Renshaw, Peter A. Pontius
and John P. Stakel.
BY
G. M. Crawford
ATTORNEY Nov. 2, 1943.   D. E. RENSHAW ET AL   2,333,580
LEAD ENTRANCE
Filed March 19, 1942    2 Sheets-Sheet 2
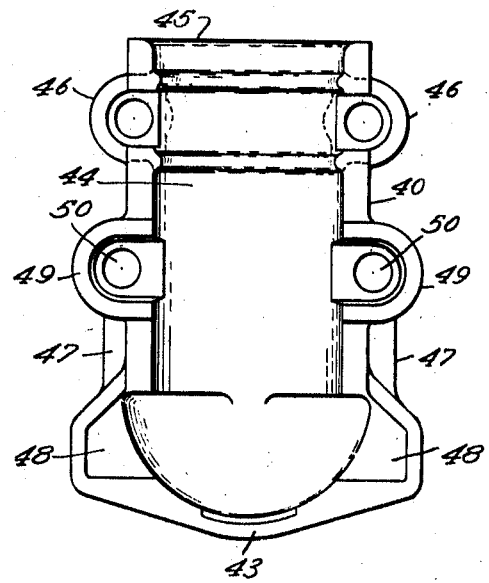
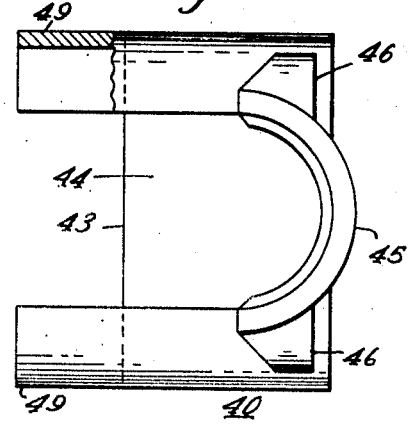
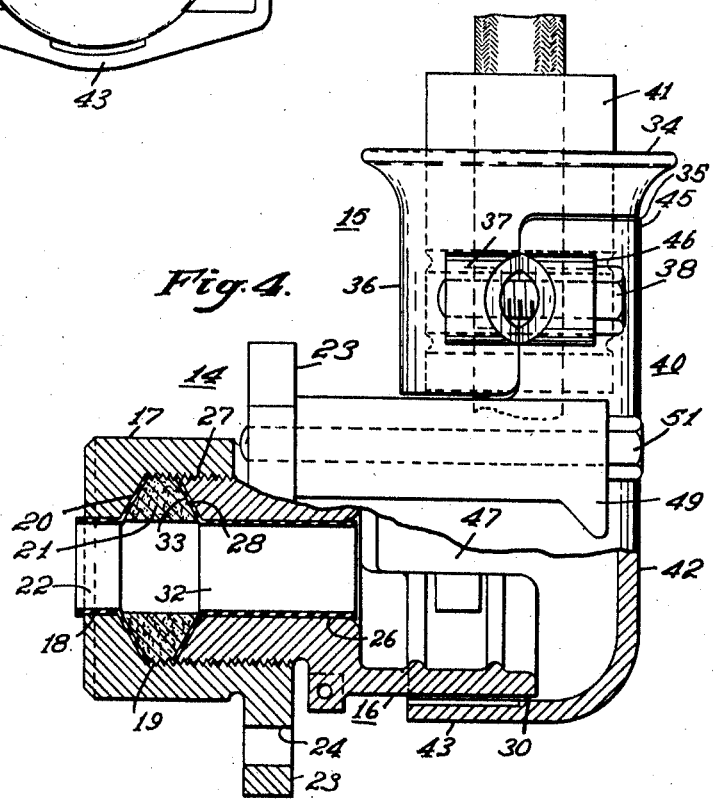
WITNESSES:
INVENTORS
David E. Renshaw, Peter A. Pontius
and John P. Stakel.
BY
ATTORNEY Patented Nov. 2, 1943

2,333,580

UNITED STATES PATENT OFFICE 2,333,580

LEAD ENTRANCE

David E. Renshaw, Wilkinsburg, Peter A. Pontius, East Pittsburgh, and John P. Stakel, Edgewood, Pa., assignors to Westinghouse Electric & Manufacturing Company, East Pittsburgh, Pa., a corporation of Pennsylvania Application March 19, 1942, Serial No. 435,388

8 Claims. (Cl. 174—65)

Our invention relates generally to lead entrances, and it has reference in particular to lead entrances for enclosures for electrical apparatus.

Generally stated, it is an object of our invention to provide a universal stuffing box lead entrance for enclosures which will be simple and inexpensive to manufacture and which may be easily installed.

More specifically, it is an object of our invention to provide a stuffing box lead entrance for electrical apparatus enclosures having a detachable mouthpiece which may be used in one position for providing a straight lead entrance and in another position with an intermediate elbow member for providing an angle lead entrance.

It is also an object of our invention to provide a lead entrance which may be readily converted from a straight type to an angle type without interfering with the packing, stuffing box, or lead.

It is another object of our invention to provide a lead entrance having a plurality of component parts which may be arranged in different combinations to suit different operating conditions.

Yet another object of our invention is to provide a universal stuffing box lead entrance having a mouthpiece which may be either attached to one portion of the lead entrance or to an auxiliary elbow member interposed therebetween.

Still another object of our invention is to provide a lead entrance for explosion-proof enclosures which will accommodate a large number of lead sizes under a plurality of different operating condtions with but a minimum of parts.

It is also a further object of our invention to provide a lead entrance with a detachable mouthpiece having an extension on one side which cooperates with an extension on the other side of one or another fixed portions of the lead entrance to clamp the lead therebetween.

Other objects will in part be obvious, and will in part be explained hereinafter.

In accordance with our invention, a simple and inexpensive stuffing box lead entrance may be provided for a lead cable or conductor used with or without a protective hose, which lead entrance is readily adapted to a plurality of operating conditions without interfering with stuffing box proper or with the lead. A flanged mounting piece may be provided for attaching the lead entrance to an enclosure, having an opening therethrough for a lead cable with a recess for a packing. A packing piece or intermediate support member is provided having one end positioned in the recess to secure the packing therein and a projection at the other end along one side. A mouthpiece having a bell mouth ring at the outer end for receiving the lead, and a projecting portion along one side which is complementary to the projecting portion of the packing piece is secured to the packing piece and cooperates therewith to clamp the lead or its protective hose therebetween. The mouthpiece is detachable from the packing piece and may be removed therefrom and secured in a similar manner to an elbow member having an end portion cooperative with the projection on the mouthpiece to clamp the lead or hose, and which may be secured to the mounting member at the other end.

For a more complete understanding of the nature and scope of our invention, reference may be had to the following detailed description which may be read in connection with the accompanying drawings, in which:

Figure 1 is a side elevational view of a lead entrance embodying the principal features of the invention;

Fig. 2 is a front end elevational view of the lead entrance of Fig. 1 removed from the enclosure;

Fig. 3 is a sectional view taken along the line III—III of Fig. 2 with the cable and the upper portion of the split bushing removed;

Fig. 4 is a side elevational view partly in section of a lead entrance embodying a modification of the invention;

Fig. 5 is an end elevational view of the elbow member shown in Fig. 4; and

Fig. 6 is a plan view of the elbow member of Fig. 5.

Referring particularly to Fig. 1, the reference numeral 10 may denote generally a stuffing box lead entrance which provides for passing a lead or cable 11 through an opening 12 in the wall 13 of an enclosure, casing or the like and providing a tight joint.

Referring to Figs. 2 and 3 as well as Fig. 1, it may be seen that the lead entrance may comprise generally a flanged mounting piece 14 which may be secured to the wall 13 in any suitable manner, an outlet or mouthpiece 15, and an intermediate support member 16 whereby the mouthpiece may be connected to the mounting piece.

The mounting piece 14 may, for example, comprise a bushing 17 having opening 18 therethrough for the cable 11. An annular recess 19 having a sloping end wall 20 may be provided adjacent the opening for receiving a suitable packing, such as the ring packing 21 which may comprise asbestos rope or the like. Suitable insulation may be provided between the cable and the bushing 17, if desired, such as, for example, the tubular bushing 22 which may be made of mica or the like, and provided with a flared end portion positioned in the recess 19 to secure the bushing in place. Means such as the flange 23, may be provided at one end of the bushing having radially spaced openings 24 therein for receiving bolts 25 for securing the mounting piece to the wall 13. If desired, the outer surface of the bushing 17 may be threaded, so that the bushing may be threaded into the opening 12 in the wall 13.

The intermediate support member 16 may not only serve to connect the mouthpiece 15 to the mounting piece 14, but it may also serve as a packing piece to press the packing 21 in the recess 19. For example, the intermediate support member 16 may be generally cylindrical with an opening 26 therein for receiving the cable or lead 11 and an end portion 27 disposed to fit in the recess 19. The end portion 27 may be provided with a sloping end portion 28 and may be threaded into the annular recess 19 to engage the packing 21 to compress it in the recess and form a gas-tight joint between the mounting piece 14 and the lead or cable 11. The intermediate support member 16 may be provided at its other end with a cut-away portion 29 on one side, which may define a substantially semi-circular or arcuate axial extension 30 on the other side. Lugs 31 may be provided on the opposite sides of the extension 30. Means may be provided for insulating the cable from the support member 16 such as the insulating bushing 32, which may be of mica or the like, and positioned within the intermediate member 16, and provided with a flared end portion 33 positioned in the recess 19 to position the bushing.

The mouthpiece 15 may comprise a substantially bell-mouth ring portion 34 flared outwardly at the outer end so as to permit bending of the lead or cable in all directions. In order to secure the mouthpiece to the intermediate support member 16, the mouthpiece may be provided with a cut-away portion 35 on one side thereof which may be shaped to receive the arcuate extension 30 of the intermediate support member, and which may define a complementary arcuate extension 36 shaped to fit in the cut-away portion of the intermediate support member. Lugs 37 may be provided on opposite sides of the arcuate extension 36 to receive bolts 38 which may be positioned in the lugs 31 of the intermediate support member 16. Means such as the split bushing 39 (only the lower half of which is shown, in order to clarify the drawings) may be positioned between the arcuate extensions 30 and 36 on opposite sides of the cable 11. The mouthpiece 15 may thus be detachably secured to the intermediate support member so as to secure the split bushing 39 therebetween and clamp the cable or lead.

Referring to Fig. 4 of the drawings, it will be seen that in order to provide an angle lead entrance the mouthpiece 15 may be removed from the intermediate support member 16 and moved along the cable or lead 11 without interfering with the packing or the lead. An elbow member denoted generally by the numeral 40 may be secured to the mounting piece 14, and the mouthpiece 15 may then be secured to the elbow member 40 to provide a complete angle or elbow lead entrance.

Referring to Figs. 5 and 6 together with Fig. 4, it will be seen that the elbow member 40 may comprise a substantially L-shaped body having, as viewed in the drawings, a substantially vertical portion 42 and a substantially horizontal portion 43 at the lower end. The inner side of the vertical portion may be provided with an opening 44, and an arcuate extension 45 may be provided at the upper end of the vertical portion on the outer side shaped to cooperate with the arcuate extension 36 of the mouthpiece 15. Means such as the lugs 46, may be provided on opposite sides of the arcuate extension 45 for receiving the bolts 38 to secure the mouthpiece 15 to the elbow member 40 and clamp the lead 11 and the protective hose 41 in which it may be encased, therebetween. The arcuate extension 45 may be so shaped that the split bushing 39 of Figs. 2 and 3 may be used with the cable 11 in place of the protective hose, if desired. Likewise, the hose may be used in the arrangement shown in Figs. 1 through 3, in place of the split bushing.

The horizontal portion 43 of the elbow member may be shaped to fit about the arcuate extension 30 of the intermediate support member 16, having side walls 47 which project upwardly on each side about the intermediate support member and are joined to the vertical portion 42, so as to provide a substantially enclosing elbow. Recesses 48 may be provided in the side walls to receive the lugs 37 of the intermediate support member 16. Suitable means may be provided for securing the elbow member 40 relative to the intermediate support member 16, such as, for example, the lugs 49, which may be provided with openings 50 for receiving bolts 51, which may be threaded into one or more of the openings 24 in the flange 23 of the mounting piece to which the intermediate support member is also secured.

Since the elbow member 40 is open along the inner side thereof, it may be readily positioned intermediate the mouthpiece 15 and the mounting piece 14 without disturbing the packing cable or lead 11. The mouthpiece 15 need only be detached from the intermediate support member and slid a short distance along the cable or lead. The elbow member 40 may then be positioned about the lead and about the arcuate extension 23 of the intermediate support member 16, and secured to the mounting piece by means of the bolts 51 to provide a substantially enclosing elbow for the lead. The mouthpiece 15 may then be slid back along the lead into position and fastened to the extension 45 of the elbow member to clamp the hose 41 or the split bushing 32 and the lead firmly therebetween. If desired, the direction of the elbow may be readily changed by rotating the mounting piece 14 in the opening 12 and using different openings 24 in the flange thereof for securing the mounting piece to the wall 13.

From the above description and the accompanying drawings it will be apparent that we have provided in a simple and effective manner for bringing a lead out of an enclosure, casing or the like. According to our invention, an inexpensive stuffing box lead entrance may be provided which may be readily changed from a straight to an angle lead entrance without interfering with the packing, or the lead or cable positioned therein. The direction of the elbow may be easily changed by utilizing different openings 24 in the flange of the mounting piece for securing the mounting piece to the casing. If a bell mouth opening is not desired, the ring portion of the mouthpiece may be easily removed by cutting it off in line with the end of the arcuate extension 30 of the intermediate support member, without effecting the clamping arrangement of the mouthpiece and intermediate support member or elbow member. Either the split bushing 30 or the hose 41 may be used to position the cable or lead in the intermediate support member, and either may be used wtih the mouthpiece to position the cable or lead in the elbow member, thus reducing the number of parts required when changing from a straight lead entrance to an angle lead entrance.

Since different changes may be made in the above construction, and other embodiments of the invention may be made without departing from the spirit thereof, it is intended that all the matter contained in the above description or shown in the accompanying drawings shall be considered as illustrative and not in a limiting sense.

We claim as our invention:

1. A universal conductor lead entrance comprising, a mounting piece having an opening to receive the conductor, clamp means including a body portion shaped to fit about one half of the conductor and a bell-mouthed ring portion at the end remote from the mounting piece surrounding the conductor, and detachable support means positioned intermediate the mounting piece and the clamp means in abutting relation with the bell-mouthed ring portion and having an opening on one side of the conductor at the end remote from the mounting piece to receive the body portion of the clamp means, said support means comprising either a substantially straight or an elbow shaped member.

2. A conductor lead entrance comprising, a mounting piece having an axial opening for the conductor, an arcuate clamp member positioned about one side of the conductor and provided with a bell-shaped mouthpiece surrounding the conductor, an intermediate member positioned between the mounting piece and the bell-shaped mouthpiece of the clamp member and detachably secured to the mounting piece having an arcuate extension on one side of the cable disposed in abutting relation to the mouthpiece with a cut-away portion on the other side to receive the clamp member, and means connecting the extension and clamp member to clamp the conductor.

3. A stuffing box lead entrance comprising, a flanged bushing having an opening to receive a cable and an annular recess thereabouts for a packing, a packing piece having a ring portion at one end surrounding the cable and fitting in the annular recess to compress the packing and an integral extension at the other end on one side of the cable, and an arcuate clamp member provided with a bell-mouth ring surrounding the cable and abutting said extension secured in opposed relation to said extension to clamp the cable therebetween.

4. A lead entrance comprising, a bushing having an axial opening for a lead, an elbow member having an opening along one side to receive the lead engaging the bushing at one end and provided with an integral arcuate extension at the other end opposite the opening, and a mouthpiece secured to the elbow member having a bell-shaped ring portion at the end remote therefrom abutting the extension with an arcuate extension shaped to fit the opening thereof.

5. A universal cable entrance comprising, a bushing, a substantially cylindrical support member detachably secured to and projecting from the bushing having an opening therethrough for the cable and a cutaway portion at the projecting end defining a substantially semi-circular arcuate extension, an elbow member securable to the bushing having an opening along the inner side to receive the cable provided with a substantially semi-circular arcuate extension opposite the opening at the end remote from the bushing, and a mouthpiece having a ring portion at the outer end with a substantially semi-circular arcuate extension on one side at the inner end shaped to fit either the cut-away portion of the support member or the opening of the elbow member.

6. A universal lead entrance comprising, a flanged bushing having an aperture for a lead with a substantially annular packing recess thereabout, a packing piece provided with an opening therethrough for a lead having a portion at one end positioned in the packing recess and a cut-away portion at the other end defining an integral arcuate extension on one side of the lead, an elbow member securable to the bushing having an opening along the inner side to receive the lead and an arcuate extension on the end remote from the bushing opposite the opening, and an arcuate clamp member useable with the packing piece or the elbow member shaped to fit either the cut-away portion of the packing piece or the opening of the elbow member.

7. The combination in a lead entrance comprising, a substantially straight support member having a cut-away portion on one side defining an axial arcuate extension, and a mouthpiece detachably secured to the support member having a ring portion at the end remote from the support member surrounding the lead and an axial arcuate extension at the end adjacent the support member shaped to fit in the cut-away portion to clamp the lead, of an elbow member shaped to fit between the support and mouthpiece having an opening along the inner side and shaped at one end to fit about the straight support and shaped at the other end to fit in the cut-away portion and receive the arcuate extension of the mouthpiece.

8. A lead entrance comprising, a bushing having an axial opening for a lead with a packing recess adjacent thereto, a packing piece having a ring portion surrounding the cable at one end adjustably positioned in the recess and provided with an opening therethrough for the lead and the other end projecting from the recess provided with a cut-away portion on one side defining a substantially semi-circular integral projection, and a substantially semi-circular clamp member having a bell-shaped mouthpiece at one end positioned in the cut-away portion and secured to the said projection with the bell-shaped mouthpiece abutting the projecting end of the packing piece.

DAVID E. RENSHAW.
PETER A. PONTIUS.
JOHN P. STAKEL.